L. MAUCLAIRE.
PROCESS OF CINEMATOGRAPHY IN NATURAL COLORS.
APPLICATION FILED FEB. 9, 1918.
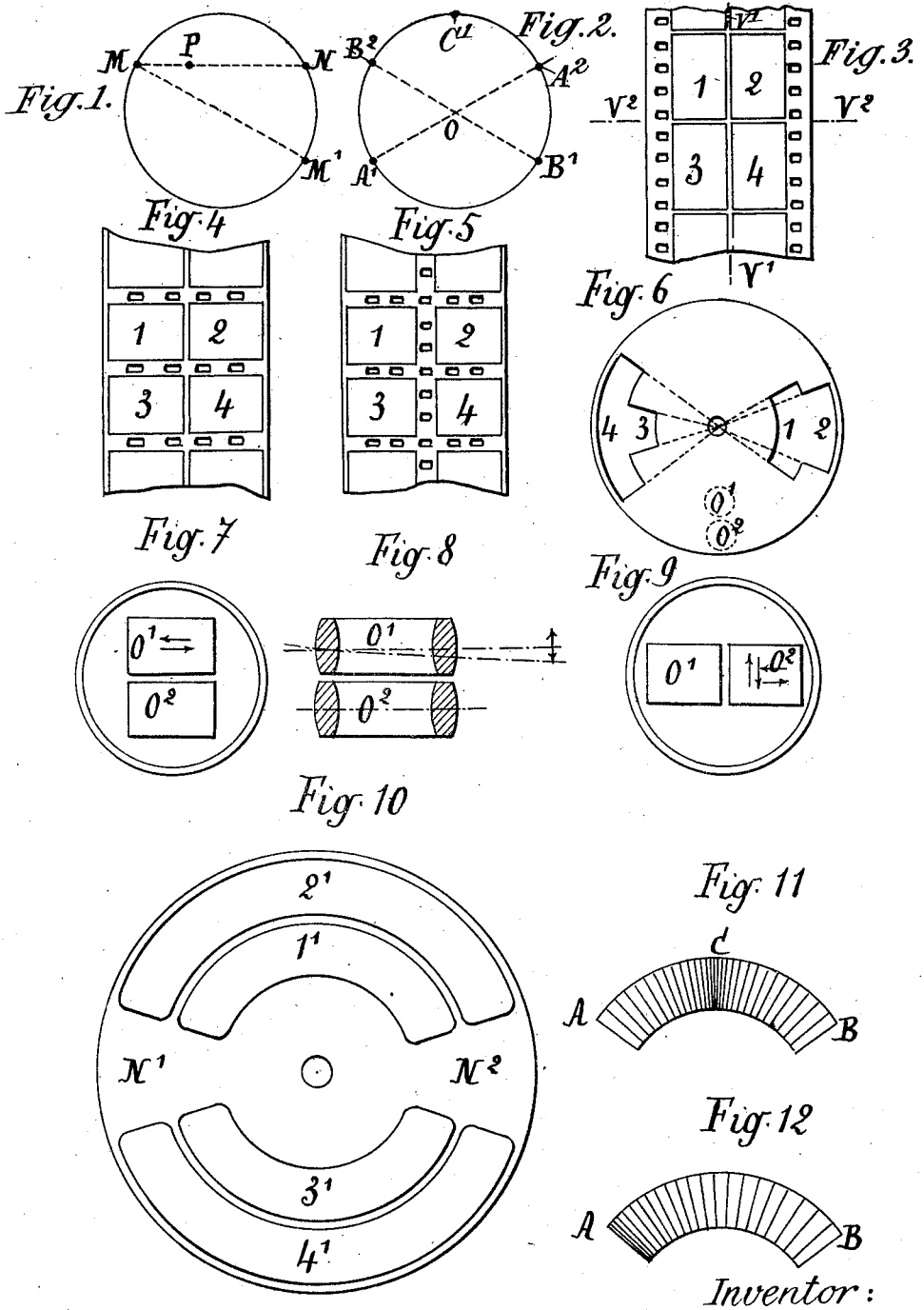

UNITED STATES PATENT OFFICE.

LOUIS MAUCLAIRE, OF PARIS, FRANCE, ASSIGNOR TO HIMSELF, ANDRÉ GARBARINI, AND GEORGES GAUTIER, OF PARIS, FRANCE.

PROCESS OF CINEMATOGRAPHY IN NATURAL COLORS.

1,421,279.     Specification of Letters Patent.    Patented June 27, 1922.

Application filed February 9, 1918. Serial No. 216,427.

(GRANTED UNDER THE PROVISIONS OF THE ACT OF MARCH 3, 1921, 41 STAT. L., 1313.)

*To all whom it may concern:*

Be it known that I, LOUIS MAUCLAIRE, a citizen of the Republic of France, residing in Paris, France, have invented certain new and useful Improvements in Processes of Cinematography in Natural Colors (for which I filed application in France, July 23, 1917, Patent No. 487,501), of which the following is a specification.

This invention relates to the art of cinematography in natural colors and has for its object to provide a process of cinematography in colors which enables a perfect projection to be obtained from the point of view of fixity, accuracy of the colors, and of facility of manipulation of the apparatus, without any additional expenditure of light.

It is known that cinematography in natural colors is based upon the employment of monochrome (single-color) views, for instance, two, three, four or more selected views, through screens, the sum of which gives white; by superposing these views the view with all its colors is obtained. Theoretically and practically bichrome (two-color) decomposition is insufficient and the selection in order to give exact results should be at least trichrome (three-color). A tetrachrome (four-color) selection gives good results but causes an undue complication of the apparatus.

In the processes employed heretobefore a certain number of monochrome views are taken either successively or simultaneously, and are successively or simultaneously projected; or, the views may be taken simultaneously, and projected successively, or vice versa.

In order to obtain perfect results it is of the first importance that the number of views which are to be superposed should be taken simultaneously. All the processes heretofore known, except that constituting the present invention may without exception be divided into the two following classes.

(1) Those in which each of the two, three or more monochromes is projected successively.

(2) Those in which all the monochromes are projected simultaneously, the monochromes being artificially obtained either upon the apparatus or upon the screen.

The processes comprised in the first class have many disadvantages and but few advantages; in fact when the monochromes are projected successively the eye of the spectator has to effect their synthesis by employing the persistence of the images upon the retina which naturally causes the spectators great fatigue. Further, if images of the normal size are taken corresponding to the images of cinematography in black the strip will be two, three or four times longer and will pass in front of the object glass at a speed two, three or four times as great according as the selection is a two, three or four-colored one, a fact which entails the rapid wear of the apparatus and frequent breakages of the film, thus necessarily increasing considerably the expense involved in these processes.

The processes comprised in the second class are better than the first mentioned but nevertheless they have very serious defects.

The fact is that in order to have perfect colors it is necessary to project simultaneously at least three monochromes, which may be done under one or the other of the two following sets of conditions:

(1) The three, four or more monochromes may cover the surface of one normal image of cinematography in black; they will thus be very small and will have to undergo a very considerable enlargement; further, the special apparatus necessary requires very complicated object glasses.

(2) Each of the three, four or more monochromes may have dimensions equal or approximately equal to the images in black, thus requiring a very considerable length of strip, excessive speed of unrolling, frequent breakages of the film, and the necessity for a much more powerful light, since it is necessary to illuminate a greater surface of images.

The separation between the axes of the object glasses corresponding to the extreme monochromes becomes very great and owing to this fact the images are no longer alike and therefore can no longer be exactly superposed; this fact explains the presence of colored fringes.

The process which constitutes the present invention is a mixed one affording the advantages of the processes indicated above without involving their disadvantages.

The selection is of a special kind in that it is trichrome but is developed upon four images, while the process has the following characteristic features;

(1) Special selection determined by the condition of exactly reproducing the colors;
(2) Special disposition of the images as far as their dimensions and their distribution upon the film are concerned;
(3) An obturator of the camera is arranged in a manner to automatically balance the monochrome negatives;
(4) A rotary screen-carrier for the projection;
(5) The construction of the projecting object glasses.

Figures 1 and 2 are diagrammatic views, illustrating in connection with the description, certain principles based upon the Chevreul chromatic circle.

Figs. 3, 4 and 5 indicate novel forms of films.

Fig. 6 illustrates a novel form of obturator.

Figs. 7 and 8 are diagrams illustrating the arrangement and adjustability of the objective lenses.

Fig. 9 is a view similar to Fig. 7, showing the objectives arranged for an arrangement of color records upon the film different from the arrangement of the records on a film for use with the objectives of Fig. 7.

Fig. 10 is a view illustrating a novel color screen.

Figs. 11 and 12 illustrate a construction of color screen in which the intensity and tone are varied in the direction of the line of travel of the screen.

In order to describe the selection as clearly and precisely as possible the chromatic circle called the "Chevreul" circle will be employed, that is to say, the solar spectrum is distributed in a circular form, the colors becoming fainter towards the centre which is white.

Referring to Fig. 1 of the accompanying drawing, this circle has the properties, firstly, that a color indicated at M is exactly complementary to the color $M^1$ diametrically opposite and secondly, that a point P compounded with the colors M and N will contain these colors mixed in the ratio of the segments M P and P N.

The best selection being the trichrome is that adopted for the improved process, but in order to render it more practical it is obtained in the following manner. Referring to Fig. 2, the two colors $A^1$, $B^1$, of the trichrome selection are preserved intact, but the third color $C^1$ is decomposed into two elementary tints $A^2$ and $B^2$ located on the prolongations of the lines AO and BO. In this manner four monochromes are obtained corresponding to a trichrome selection. Recapitulating this phenomenon, it is to be noted that the colors $A^1$, $B^1$, $C^1$, are located at the three angles of an equilateral triangle inscribed within the Chevreul circle; that two points are preserved as they are without any modification (for instance the points $A^1$, $B^1$), while the third point is decomposed into two elemetary colors $A^2$, $B^2$, such that $A^2$ is located on the straight line AO produced and $B^2$ on the straight line BO produced. The angle $A^1OB^1$ may be varied, but in order to employ the screens to the best possible advantage and to obtain the maximum exactness in the reproduction of the colors, the angle $A^1OB^1$ should be made equal to 120 degrees.

This selection (if the points $A^2$ and $B^2$ on the circle are considered) is tantamount to a double bichrome, $A^2$ being complementary to $A^1$ and $B^2$ complementary to $B^1$, but each of the groups $A^1$, $A^2$ and $B^1$, $B^2$ is connected to the other by reason of the fact that the points $A^1$ and $B^1$ are at two angles of an equilateral triangle inscribed in the Chevreul circle, the triangle having any desired position within the said circle.

The view projected with all its colors will thus comprise four images corresponding to the colors of selection $A^1$ $A^2$ $B^1$ $B^2$ and these images will be distributed in two groups of which the first group comprises the images obtained with the screens $A^1$ and $A^2$ and the second group comprises the images obtained with the screens $B^1$ and $B^2$, each group including images such that their superposition upon the screen will give a view in natural colors in nearly all the colors and tones.

The superposition of the two groups will give the tints rigorously exact with all their intensity and their varieties and the eye of the observer has only a slight work to perform as it combines together images practically complete, the synthesis of which only serves for obtaining certain shades which occur rarely if the points $A^1$ and $B^1$ are carefully chosen.

The two images which are to be projected simultaneously and which constitute one group are taken simultaneously, and each such group will given on projection a view in vivid natural colors and rich in a variety of tints, the superposition of the two groups only having the effect of perfecting the colors in all their delicacy and giving a result which is theoretically and practically perfect. It is to be noted that the screens used for the projection differ from those employed in taking the view by reason of taking into account the difference in composition between solar light and the light employed for the projection.

As regards the dimensions of the images and their distribution upon the film, two different arrangements may be made use of according as the feeding devices of the apparatus employed are normal or modified; these two cases will now be described.

In the first case the images 1 and 2 of the first group and the images 3 and 4 of the second group are arranged as shown in Fig. 3, in which the film instead of passing before the object glass from above downwards along the vertical line V¹ will pass from left to right or inversely along the line V², i. e., horizontally longitudinally of itself. Each of these images is 12x18 millimeters and it will be seen that in this case the usual cinematographic size and form is preserved.

For the second case in which the feed pinions of the film are modified a special perforation is adopted; in this case further advantages are obtained by reason of the fact that the apparatus preserves its normal position, the film unrolling in the ordinary direction whereas in the preceding case the film has to unroll horizontally; but the special perforation indicated in Figs. 4 and 5 is employed. The images 1, 2, 3, 4 are disposed in the usual manner and their dimensions are 12x16 mm., the images in each group being separated by a space of 1 mm.

The groups are separated from one another a sufficient distance to enable two, three or four holes to be made in the strip in order to ease the operation, as illustrated in Fig. 4 which shows four such holes; similar holes may also be made between the images of each group as shown in Fig. 5. This distribution of the images upon the film is of advantage because, by maintaining a normal speed of the film the number per second will be increased from ten to fifteen per cent, by reason of their form, a fact which will diminish the sparking and will at the same time be of benefit to the spectators.

In order to obtain monochrome negatives the luminous rays will be filtered by means of the screens explained above, that is to say two normal screens of the trichrome selection and two other screens the sum of which gives the third tint of the trichrome. The images 1 and 3 pass in front of one object glass and 2 and 4 in front of the other, the distance of the axes of the two object glasses being equal to the distance between the geometrical centres of the images 1 and 2 or 3 and 4.

A special taking obturator is necessary because the four screens for taking the views have not exactly the same times of exposure, that is to say they absorb more or less of the luminous rays owing to being more or less opaque. But in order to have the images exactly superposable in subsequent projection it is necessary that they should be identical, that is, they should have the same distinctness at different planes and this implies the condition of equal "diaphragming" the two object glasses. In order to place the images in equilibrium the obturator arrangement shown in Fig. 6 may be employed, which gives, when desired, four differently timed exposures. The openings 1, 2, 3, 4, corresponding to the images 1, 2, 3, 4, have a useful area proportional to the opacity of the screens for taking the views A¹, A², B¹, B², and also inversely proportional to the sensitiveness of the emulsion to the radiations corresponding to these screens.

It can be seen that the time of exposure for one uniform revolution of the axis of the obturator is proportional to the angle at the centre corresponding to each of these openings. In the case shown in Fig. 6 the exposures are in the increasing order 3, 2, 1, 4, that is to say, the screens are in the order of increasing transparence to a perfectly orthochromatic sensitization 3, 2, 1, 4, which also corresponds to the respective sensitivenesses in decreasing order if the screens had the same opacity and the same absorption. With this obturator the equilibrium of the monochrome negatives is effected automatically thus enabling the two diaphragms of the object glasses O¹ O² to be connected by a small rod and thus obtain images of identically the same distinctness whatever the depth of the field may be, the images being thus exactly similar and consequently easily superposable. Having thus obtained the negative film a positive proof is prepared in the same manner as for cinematography in black.

In order that the positive film may be projected and exactly reproduced, the view in colors should be placed under conditions analogous to those under which the view was taken, that is to say, each group of images 1, 2, and 3, 4, at the moment of projection should be properly placed in regard to screens corresponding to those used in taking the view. These projecting screens differ materially from those used in taking the view as the electric arc used for projection has not the same spectrum as solar light. Thus each group of images should be placed in front of the projecting object glasses at the same time as the corresponding screens.

The projecting object glass and a screen-carrier will now be described. The special object glass for projection in colors is compounded of two object glasses O¹, O² cut to the dimensions of the images, their axes being the same distance apart as that separating the geometrical centres of the two images of a group. These two object glasses are placed in the same tube and one of them is fixed while the other is linked in a manner enabling it to oscillate both in a horizontal and in a vertical direction as indicated by the arrows on Figs. 7 and 9 in order that the two luminous bundles of rays may be caused to converge upon the screen and the two images be made to coincide exactly. The object glasses are disposed as shown in Figs. 7, 8 and 9, according as the strips have normal or special perforations.

Figs. 7 and 8 show a section and a diagram illustrating the regulating arrangement for films having normal perforations while Fig. 9 shows an arrangement for special perforations. The two object glasses are arranged to be simultaneously focused, in any suitable manner. It will of course be understood that the two object glasses, as far as their optical composition, construction and focal distances are concerned, should be absolutely alike.

The projecting screens are disposed as shown in Fig. 10 the screen carrier disc making one revolution for the projection of two groups of monochromes, that is to say, for one complete view or also for two film shifts. If the film has the usual perforations it will be arranged as shown in Fig. 10, the screens $2^1$ and $4^1$ passing in front of the same object glass and the screens $1^1$ and $3^1$ passing in front of the other object glass, while two opaque portions $N^1 N^2$ come in front of the object glass during the film-shift. These portions $N^1 N^2$ may be omitted if the ordinary obturator of the projecting apparatus remains, this obturator rotating twice as fast as the screen carrier disc and consequently making one revolution per film-shift.

The projecting screens might be either homogeneous or divided up as may be desired. If the latter they will be as shown in Figs. 11 and 12. Fig. 11 shows a screen divided up from the centre C towards the two ends A and B while Fig. 12 shows a screen divided up from one end A towards the other B. By the term "divided up" it is to be understood that the screens constituting each sector of the screen carrier disc are divided up in tone and in intensity. In tone, the color starting from the corrected tint corresponding to the screen used in taking the view passes through the tints in the immediate vicinity in the spectrum. In intensity, the screen will be divided up in the ordinary sense of the word, that is to say, will have an opacity which is variable in a linear direction or according to any desired relation of the length to be divided up, for example according to the logarithm. Each screen may practically be composed of several partial screens which in practice facilitates the construction, and the partial screens are stuck together by thin metallic parts arranged according to the radii of the screen carrier disc. The screen carrier may be constructed of the lightest possible materials such as aluminium or pasteboard.

Claims:

1. A process of taking or projecting motion pictures in color, comprising taking or projecting an image or scene in sets of four color records, two of the records being of primary colors, and two being records of two colors whose combination constitute the third primary color complemental to the colors of the two primary color records aforesaid, and interposing a moving colored screen having the four colors selected, each colored part of the screen having a varying color tone.

2. A process of taking or projecting motion pictures in color, comprising taking or projecting an image or scene in sets of four color records, two of the records being of primary colors, and two being records of two colors whose combination constitute the third primary color complemental to the colors of the two primary color records aforesaid, and interposing a moving colored screen having the transparency of the several parts of the screen varied to give substantially equal illumination.

3. A process of taking or projecting motion pictures in color, comprising taking or projecting an image or scene in sets of four color records, two of the records being of primary colors, and two being records of two colors whose combination constitute the third primary color complemental to the colors of the two primary color records aforesaid, and interposing a moving colored screen having the four colors selected, each colored part of the screen having a varying tone and the transparency of the several parts of the screen varied to give substantially equal illumination.

4. A process of cinematography in colors, comprising making a selection of four images in groups of two, taken simultaneously, taken through selection screens, two of which are of primary colors, the two other screens being of colors obtained by the decomposition of the third primary color complemental to the two other primary colors aforesaid, and obturating the views by an obturator having four openings, each opening corresponding to a screen, and said openings having an area proportional to the angle or center corresponding to each opening, to the opacity of the screens, and inversely to the sensitiveness of the emulsion for radiations corresponding to the screen, and projecting the four images through four projection screens mounted upon a circular support, the said projection screens differing from the taking screens only by the difference of spectral composition between sunlight and the artificial light employed for projection.

In witness whereof, I have hereunto signed my name in the presence of two subscribing witnesses.

LOUIS MAUCLAIRE.

Witnesses:
CHAS. P. PRESSLY,
RENÉ BARDY.